United States Patent [19]

Sagaser

[11] Patent Number: 4,516,439

[45] Date of Patent: May 14, 1985

[54] PUMP CENTERING CONTROL

[75] Inventor: Thomas M. Sagaser, Bismarck, N. Dak.

[73] Assignee: Clark Equipment Company, Buchanan, Mich.

[21] Appl. No.: 251,439

[22] Filed: Apr. 6, 1981

[51] Int. Cl.[3] .......................... G05G 1/00; G05G 1/14
[52] U.S. Cl. ........................ 74/470; 74/512; 74/474
[58] Field of Search .............. 74/512, 513, 560, 474, 74/478, 470; 267/150

[56] References Cited

U.S. PATENT DOCUMENTS

| Re. 27,813 | 11/1973 | Haffner | 74/474 |
|---|---|---|---|
| 2,136,023 | 11/1938 | Russell | 74/470 |
| 2,270,866 | 1/1942 | Cotesworth et al. | 74/470 |
| 2,621,533 | 12/1952 | Schotz | 74/335 |
| 3,313,174 | 4/1967 | Walker et al. | 74/474 |
| 3,370,424 | 2/1968 | Swanson et al. | 60/53 |
| 3,477,439 | 11/1969 | Hamouz et al. | 180/70 |
| 3,488,955 | 1/1970 | Buelow | 60/53 |
| 3,541,878 | 11/1970 | Haffner | 74/474 |
| 3,599,507 | 8/1971 | Exton | 74/469 |
| 3,646,832 | 3/1972 | Hirafuji | 74/519 |
| 3,792,744 | 2/1974 | Gray | 180/6.48 |
| 3,915,022 | 10/1975 | Walton | 74/470 X |
| 3,939,726 | 2/1976 | Ahrens | 74/513 |
| 3,961,542 | 6/1976 | Fulghum et al. | 74/470 |
| 3,995,510 | 12/1976 | Yost | 74/478.5 |
| 4,086,823 | 5/1978 | Fatur | 74/474 |
| 4,109,540 | 8/1978 | Habiger | 74/96 |
| 4,111,062 | 9/1978 | Callaghan | 74/96 |
| 4,125,032 | 11/1978 | Shuler | 74/96 |

*Primary Examiner*—Kenneth J. Dorner
*Assistant Examiner*—Vinh Luong
*Attorney, Agent, or Firm*—John C. Wiessler

[57] ABSTRACT

A centering mechanism for the hydrostatic drive system of an articulate loader includes an actuating mechanism disposed between the pedal control and the output pump of the loader which returns to a centered or neutral position when the pedal control is released. A pair of torsion springs bias the actuating mechanism in opposite rotative directions to maintain the control in a centered or neutral position.

7 Claims, 2 Drawing Figures

PUMP CENTERING CONTROL

CROSS REFERENCES

U.S. patent applications filed simultaneously herewith, one in the names of Thomas M. Sagaser et al entitled "Hydrostatic Control System for Articulate Loader", Ser. No. 251,440, filed Apr. 6, 1981 now abandoned, and the other in the name of Charles W. Frost entitled "An Improved Arrangement for the Brake System of a Hydrostatic Loader Including a Valve Port Block", Ser. No. 251,438, filed Apr. 6, 1981 now U.S. Pat. No. 4,417,649, both assigned to the Assignee of the present invention.

BACKGROUND OF THE INVENTION

1. Field of Use

Hydrostatic drive trains used as power modules for front-end loader type vehicles typically include a variable displacement pump coupled with an output drive motor, the pump having an infinitely variable position swash plate which controls the power output of the drive motor and is movable from a central neutral position to a full forward or a full reverse position with an infinite range of power outputs between the neutral position and the respective full power positions. However, because of the dynamics of the flow of hydraulic fluid within a hydrostatic drive system, it is difficult to achieve an unaided central neutral position. Without an appropriate centering mechanism the swash plate of the hydrostatic pump would not automatically remain in the neutral position when returned there, but rather the dynamics in the fluid flowing through the system would cause the vehicle to "creep" in either a forward or reverse direction.

2. History of the Prior Art

Patents have generally been directed to various proposals for centering devices. For example, a typical spring arrangement may be found in U.S. Pat. No. 3,488,955 entitled "Hydrostatic Transmission Drive Pump Swash Plate Control" wherein a torsion spring biases a cam follower against one side only of a cam slot to prevent the cam follower from hunting between two sides of the cam so that a neutral position of the drive pump swash plate is established whenever the control lever is moved to its neutral position.

In U.S. Pat. No. 3,477,439 entitled "Riding Mower with Forward and Reverse Belt Drive", a bell crank is pivoted about a bolt in response to a forward force applied by a connecting rod which is connected with a pedal. A single torsion spring in contact with the bell crank returns the bell crane from a forward position to an initial position.

A third form of centering device available in the prior art may be found in U.S. Pat. No. 3,313,174 entitled "Self-Centering Speed Control for Hydraulic Transmissions" in which a captured spring unit operates to return a control lever to a neutral position. Although several other arrangements could be cited here, nowhere does the prior art disclose the present invention.

SUMMARY OF THE INVENTION

The present invention is directed toward providing a precise centering mechanism for the variable position swash plate of a hydrostatic drive system. This invention comprises a pump centering control for the hydrostatic power system of an articulated front-end loader, the pump centering control mechanism interposed between and urging both the swash plate of the hydrostatic pump and its associated foot pedal to a neutral position when the operator of the loader releases the foot pedal from either a forward or reverse operative position for the vehicle.

The pump centering control comprises support means in the form of a U-shaped mounting bracket. An actuating means including a bellcrank lever is pivotally mounted on the support means. Biasing means comprising opposed torsion springs having outwardly extending opposite ends are also mounted on the actuating means. Fixed pins provided on the mounting bracket engage respective ends of the torsion springs. Engaging means provided on the actuating means co-act with respective torsion springs when the actuating means operates against the bias of one or the other of the springs to move in either the forward or reverse direction. When the foot pedal is released the active torsion spring returns the actuating means to a neutral position. The pins on the mounting bracket cooperate with the torsion springs to establish a neutral position.

The particular arrangement of the present invention provides a positive means for assuring a return to the neutral position of both the foot pedal and the movable swash plate of the hydrostatic drive system.

BRIEF DESCRIPTION OF THE DRAWINGS

Other advantages of the present invention will become apparent from the following description and accompanying drawings wherein.

DETAILED DESCRIPTION OF THE PRESENT INVENTION

Figure 1:
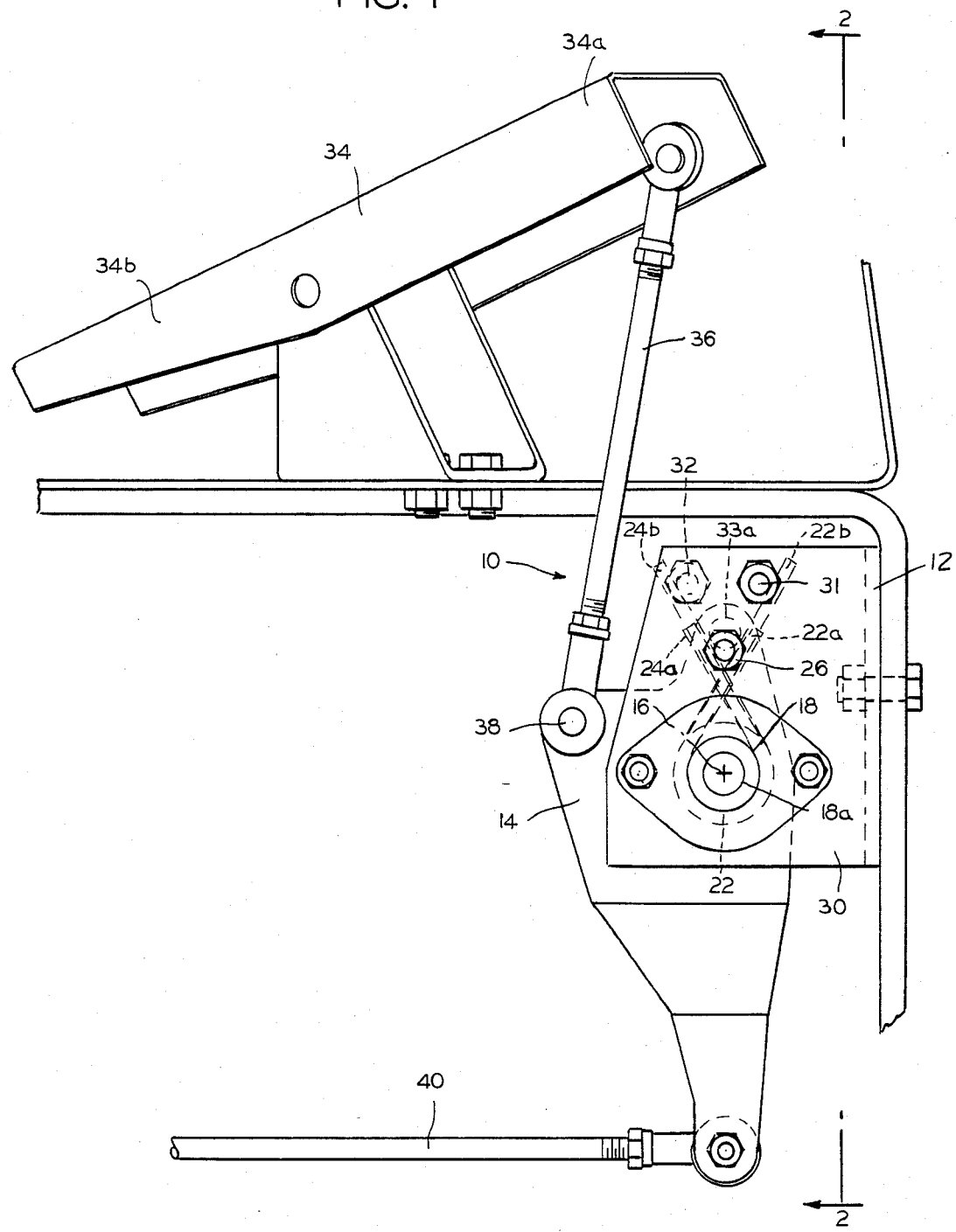
FIG. 1 is a side elevational view of the pump centering control of the present invention.
Figure 2:
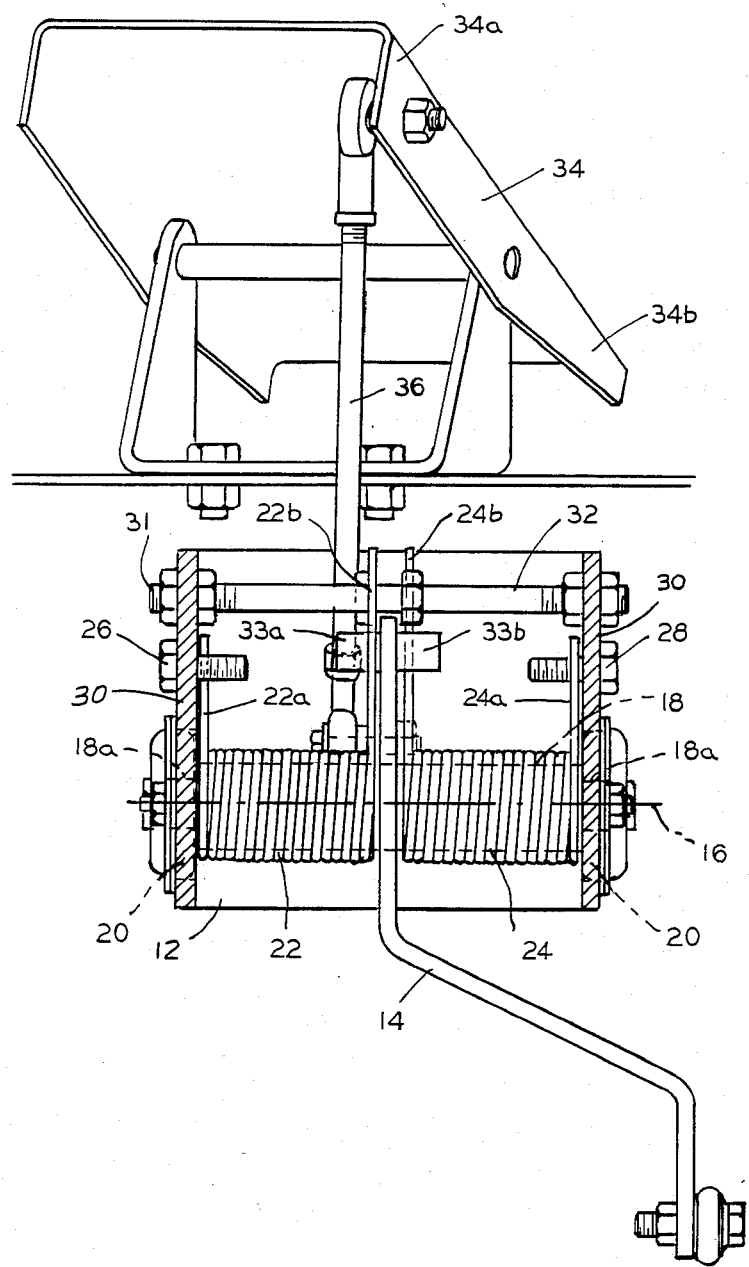
FIG. 2 is a rear elevational view of the pump centering control of the present invention.

The pump centering control 10 of the present invention utilizes a U-shaped channel member 12 that is bolted to the frame (not shown) of a vehicle. A bell crank 14 is pivotally mounted in the channel member 12 along axis 16 by a pin 18. The pin 18 is inserted through an opening (not shown) in the bell crank 14 and then welded in place so that equal portions of the pin 18 extend outwardly from opposite sides of the bell crank 14. The outside diameter (O.D.) of the pin 18 is slightly smaller than the inside diameter (I.D.) of each of torsion springs 22,24.

Torsion springs 22 and 24 are then mounted on pin 18 on opposite sides of the bell crank 14 and generally aligned along the axis 16. The bell crank and spring assembly is then mounted on bearings 20 provided in opposite sidewalls 30 of the support bracket 12. The pin 18 has step-down portions 18a at opposite ends which are received in respective inner races of the bearings 20. Springs 22 and 24 have opposite ends or arms 22a, 22b and 24a, 24b extending tangentially outwardly from the springs 22,24 which outer ends 22a, 24a lie adjacent the sidewalls 30 of the channel member 12 and are initially preloaded or biased against respective first opposed pins 26 and 28 rigidly mounted on the sidewalls 30 of the member 12. Second opposed pins 31 and 32 also rigidly mounted on the sidewalls 30 of the member 12 extend substantially further inwardly than pins 26,28 to engage respective inner ends 22b,24b of the springs 22,24.

Pins 33a,33b are disposed along a common axis and rigidly mounted on opposite sides of bell crank 14 in such a manner as to cooperatively establish a fixed neutral position for the bell crank 14 between the opposed biases of spring ends 22b,24b biased against second pins 31,32 of the support member 12. Thus, the spring end 22b engages crank pin 33a and is biased against support pin 31, and the spring end 24b engages crank pin 33b and is biased against support pin 32.

The bell crank 14 may be operated by respective toe and heel inputs from a foot pedal 34 through a pedal link 36 pivotally connected to the bell crank 14 at pivot point 38. When the foot pedal 34 is urged downwardly by toe pressure at upper end 34a of pedal 34, the pedal link 36 moves downwardly to pivot the bell crank 14 counterclockwise and urge a swash plate control lever 40 forward.

The control lever 40 is rigidly connected to an operating mechanism associated with the swash plate of a drive mechanism discussed in greater detail in co-pending application Ser. No. 251,440 entitled "Hydrostatic Control System for Articulate Loader" and concurrently filed with the subject application and assigned to the Assignee of the present invention. Reference may be had thereto for a more complete description of the drive mechanism. Moving the bell crank 14 counterclockwise, as seen in FIG. 1, moves the bell crank pin 33b against the bias of the spring arm 24b of the torsion spring 24, while the spring arm 22b of the torsion spring 22 would remains in its neutral position. Once the loader operator releases the foot pedal 34 the bias of the spring arm 24b of the torsion spring 24 returns the bell crank 14 to its neutral or centered position.

Alternatively, heel pressure at lower end 34b of pedal 34 urges the pedal link 36 upwardly to rotate the bell crank 14 in a clockwise direction against the bias of the spring arm 22b of the torsion spring 22, while spring arm 24b remains in a neutral position. When the foot pedal is released by the loader operator the natural bias of the spring arm 22b will return the bell crank 14 to a neutral position.

The embodiments of the present invention in which an exclusive property or privilege is claimed are defined as follows.

We claim:

1. A pump centering control for defining a neutral position in a hydrostatic transmission comprising:

a bell crank mechanism including a bell crank lever pivotally mounted on a fixed support bracket having opposite side walls;

first and second torsion springs mounted on the pivotal mounting of said bell crank lever on opposite sides thereof, the one ends of the springs engaging elements mounted on said opposite walls of the support bracket, the other ends of said springs engaging a pair of elements rigidly mounted on opposite sides of the bell crank lever; and means for moving the bell crank lever in one direction against the bias of one only of the torsion springs and in the opposite direction against the bias of the other only of the torsion springs whereby release of said moving means causes the spring end engaging the element on the bell crank lever to return the bell crank to a neutral position of the pump centering control.

2. A pump centering control as claimed in claim 1 wherein said first and second torsion springs have opposite ends thereof extending tangentially outwardly therefrom.

3. A pump centering control as claimed in claim 1 wherein said bellcrank lever is operably connected between a foot pedal of a vehicle and a swash plate control lever for controlling the hydrostatic transmission.

4. A pump centering control as claimed in claim 1 wherein bearings are provided in said opposite side walls for receiving respective portions of a pin which carries the bellcrank mechanism.

5. A pump centering control as claimed in claim 1 wherein the support bracket comprises a U-shaped channel, and said other ends of the torsion springs are located on opposite sides of the bellcrank lever.

6. A pump centering control as claimed in claim 1 wherein said other ends extend tangentially outwardly of said first and second torsion springs in a cross-over relation one to the other.

7. A pump centering control as claimed in claim 6 wherein said cross-over spring ends extend outwardly on opposite sides of respective ones of said pair of elements which are mounted on opposite sides of the bellcrank lever.

* * * * *